United States Patent [19]
Martin

[11] 3,852,956

[45] Dec. 10, 1974

[54] AIRCRAFT ENGINE PRESSURE RATIO AUTOTRIM SYSTEM

[75] Inventor: Anthony N. Martin, Simsbury, Conn.

[73] Assignee: United Aircraft Corporation, East Hartford, Conn.

[22] Filed: Dec. 3, 1973

[21] Appl. No.: 421,015

Related U.S. Application Data

[62] Division of Ser. No. 274,123, July 21, 1972, Pat. No. 3,813,063.

[52] U.S. Cl. ............ 60/39.15, 60/39.28 R, 60/224, 73/117.3, 235/150.21

[51] Int. Cl. ............................ F02c 7/02, F02g 1/06

[58] Field of Search ......... 60/39.15, 39.16, 39.28 R, 60/224; 73/117.3, 117.4, 178 R, 178 T; 235/150.21, 150.2; 244/77 R, 77 D, 77 F; 340/27 R, 27 NA

[56] References Cited
UNITED STATES PATENTS

| | | |
|---|---|---|
| 3,174,284 | 3/1965 | McCarthy ................. 235/150.21 X |
| 3,238,768 | 3/1966 | Richardson ................. 235/150.2 X |
| 3,299,701 | 1/1967 | Scarlett ............................ 73/178 R |
| 3,697,731 | 10/1972 | Kempema et al. ................. 235/150.2 |
| 3,736,796 | 6/1973 | Hohenberg ........................ 73/178 T |

Primary Examiner—Trygve M. Blix
Assistant Examiner—Stephen G. Kunin
Attorney, Agent, or Firm—Donald F. Bradley

[57] ABSTRACT

An automatic thrust management system for gas turbine engines in single or multi-engine aircraft is disclosed. An engine pressure ratio limit is automatically calculated using known techniques and compared with the actual engine pressure ratio of the engine having the maximum pressure ratio for the purpose of an automatic control system. In one mode of operation, the throttles for each engine are trimmed to maintain the engine pressure ratio at the limit value. In another mode of operation, each engine is trimmed as necessary to insure that the engine pressure ratio does not exceed the limit value. The automatic thrust management system of this invention may be incorporated together with existing autothrottle systems in aircraft which control the engine throttles as a function of airspeed error.

4 Claims, 3 Drawing Figures

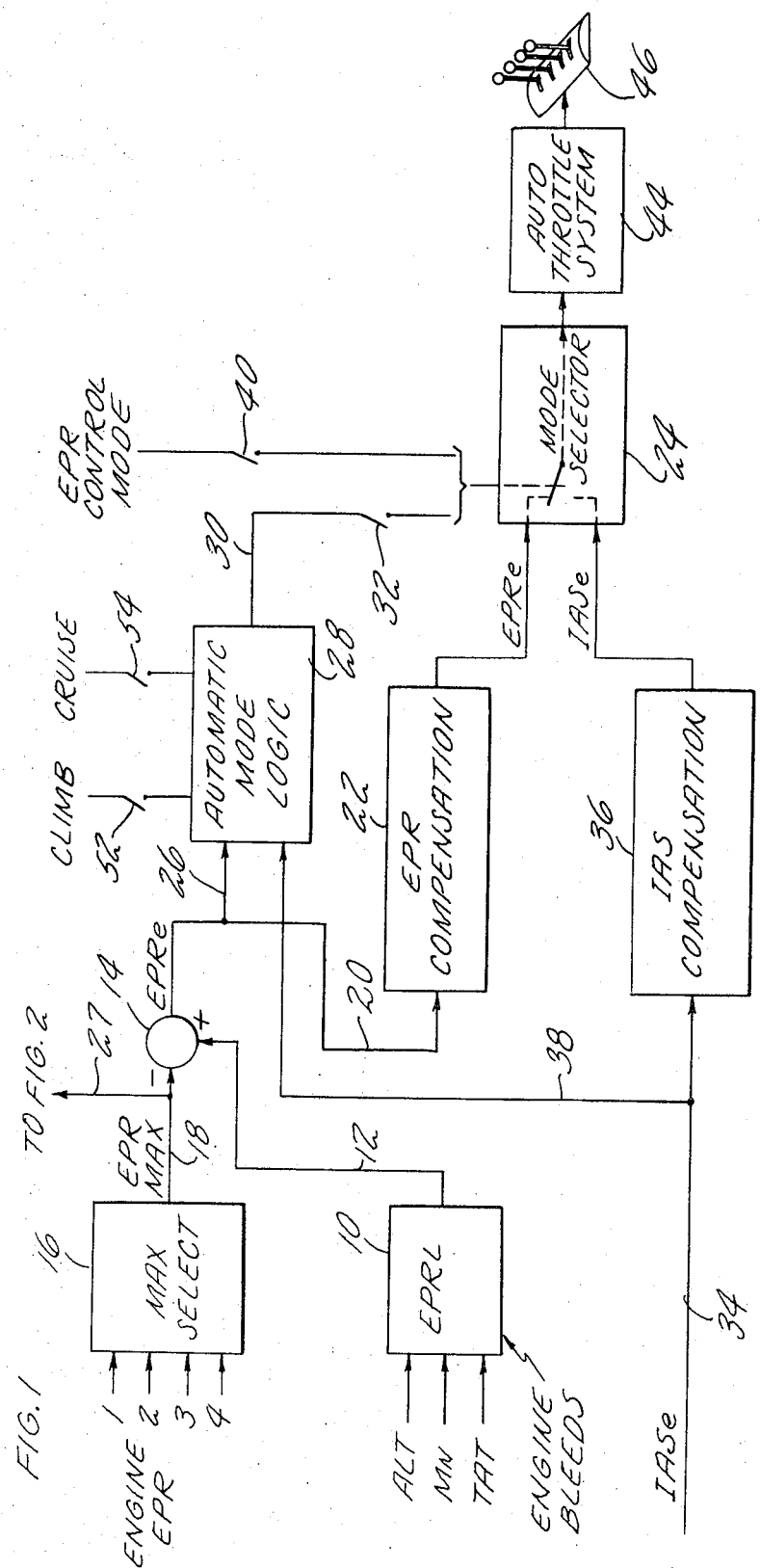

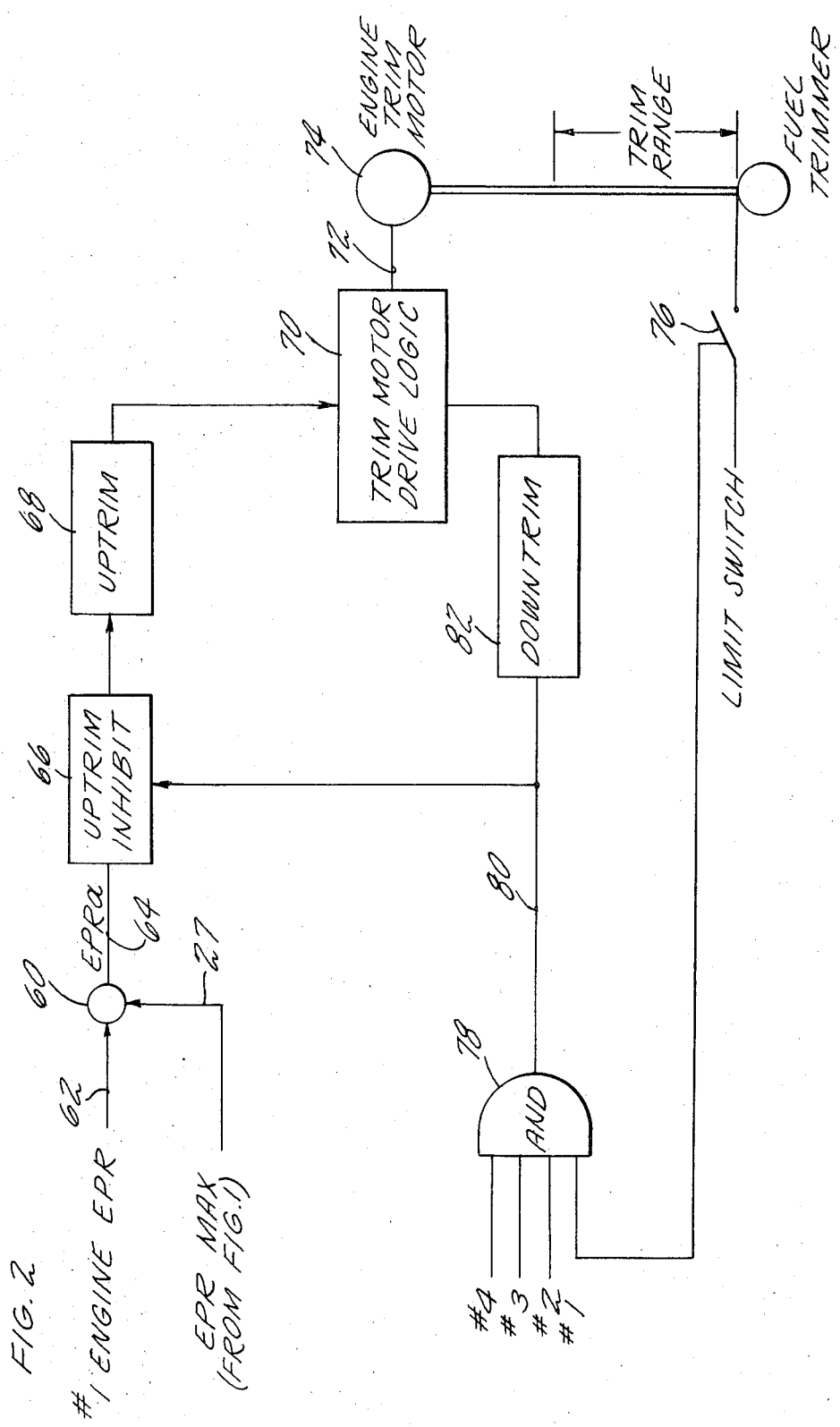

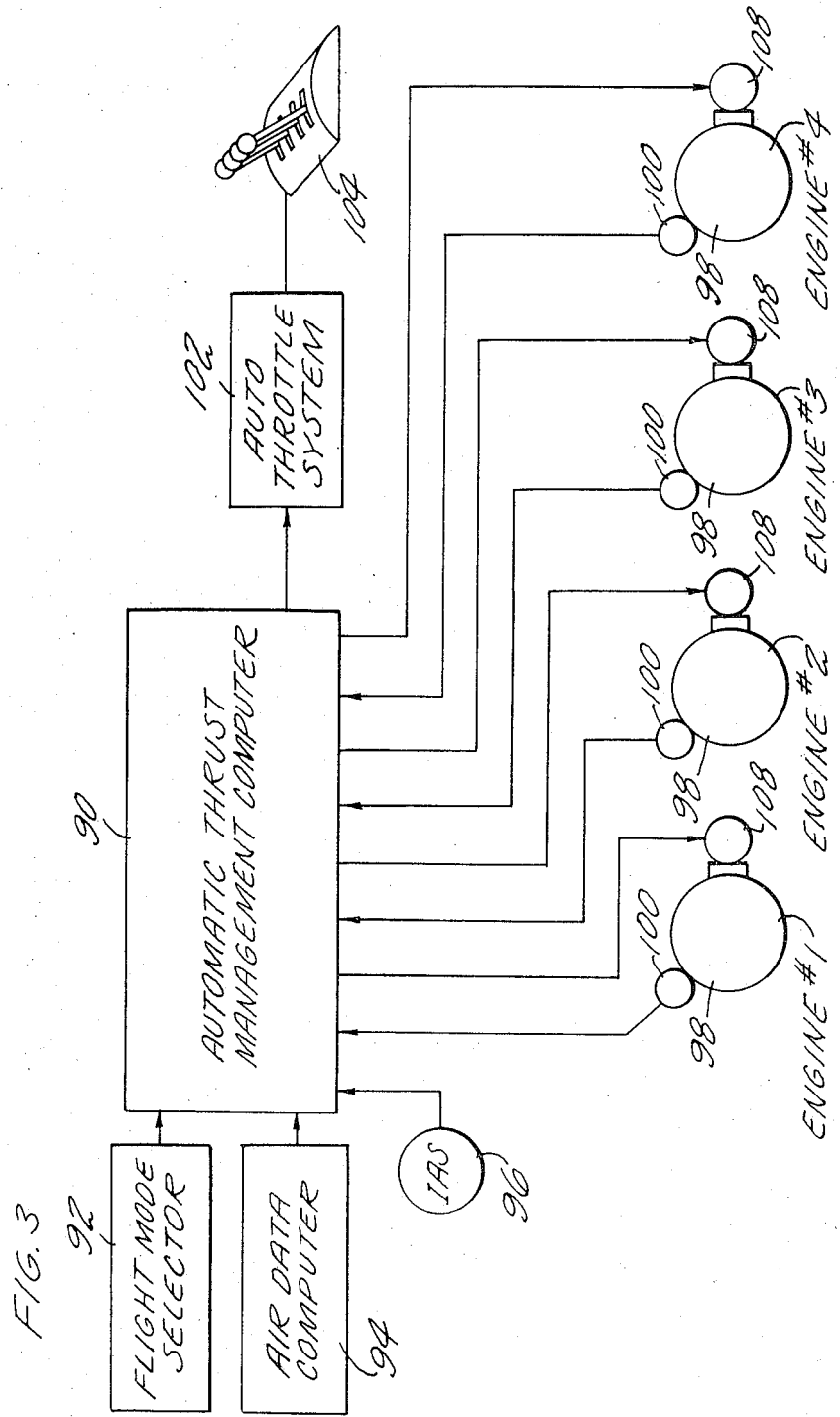

AIRCRAFT ENGINE PRESSURE RATIO AUTOTRIM SYSTEM

This is a division, of application Ser. No. 274,123, filed July 21, 1972, now U.S. Pat. No. 3,813,063.

BACKGROUND OF THE INVENTION

1. Field of the Invention

This invention relates to gas turbine engines for aircraft, and in particular to an automatic thrust management system for multi-engine aircraft. The automatic thrust management system provides automatic regulation of the throttles or power levers for each engine to insure that the engine thrust ratio does not exceed a value which will cause damage to or overly reduce the service life of the engine. In one mode of operation of the invention, the engine throttles are adjusted so that each engine will be operating in its most efficient manner at or near the engine pressure ratio limit. The automatic thrust management system may be used concurrently with existing autopilot or autothrottle systems in aircraft to prevent duplication of engine throttle controls thereby reducing the cost of installation. Existing autothrottle systems can only be used during a small fraction of the flight time, often the descent phase only. The system described herein permits automatic operation of the throttles throughout all phases of the flight.

In another embodiment of the present invention, the fuel control for each engine is automatically trimmed so that each engine is operating at the same pressure ratio to thereby prevent thrust unbalance between the engines due to errors in throttle settings or small changes in engine performance characteristics.

2. Description of the Prior Art

It is frequently necessary to fly an aircraft with the engines operating at the maximum thrust of which they are capable, without at the same time causing damage or severe deterioration to the engines due to exceeding predefined settings. This thrust setting is a function of the engine pressure ratio limit which can be permitted, and this ratio is dependent upon the actual flight mode (take-off, climb, cruise, etc.) and also varies continuously as a function of altitude, Mach number, total air temperature and the amount of bleed air extracted from the engine for anti-icing systems etc. Currently this engine pressure ratio limit (EPRL) is calculated by the flight crew during critical portions of the flight, typically climb, or use is made of an electronic computer which establishes the EPRL continuously and displays it on an indicator. The crew has the task of attempting to control to this limit during climb by continuously modifying the position of the power levers or throttles for each engine as the EPRL values change. This imposes a severe work load on the flight crew during a critical portion of the flight, and in practice they are not able to perform this task to the standard required. This requirement typically is to adjust the actual engine pressure ratio (EPR) to within plus or minus 0.01 of the EPRL throughout the climb phase. consequently, the engines are being deteriorated or damaged due to exceeding this EPRL resulting in a lower service life, or engine operation is inefficient resulting from the actual EPR being held far below the EPRL by other more cautious flight crews. EPR excursions below the maximum ratings have also contributed to the inability to obtain economical cruise altitude prior to leaving radar air traffic control area in some instances.

An additional problem with multi-engine aircraft is that the most efficient operation of the aircraft, particularly during cruise and also during the final landing phase, is only achieved if the engine powers are balanced one against the others. This necessitates continued small adjustments of throttle positions, to which task the flight crew is not always able to give the required attention. Also there is a need to frequently manually trim individual engine control systems as a ground based operation to maintain engine thrust characteristics as the engines deteriorate during service life, or whenever componenet parts of the control or linkage system are changed.

SUMMARY OF THE INVENTION

In accordance with the present invention, there is provided an automatic aircraft engine pressure ratio control system or automatic thrust management system in which the engine pressure ratio is automatically maintained at the engine pressure ratio limit to thereby provide maximum thrust during climb or other critical maneuvers of an aircraft. This mode of operation, referred to as the EPR control mode, automatically computes the engine pressure ratio limit (EPRL) and compares it with the maximum EPR at which any of the engines is operating. If there is a difference between the EPRL and the maximum EPR, an error signal is fed to the existing autothrottle system in the aircraft to cause the throttles for all engines to be moved simultaneously in a direction that will eliminate the error signal and maintain the engines at or near the EPRL. If an autothrottle system is not present in the aircraft, additional means must be provided to move the throttles of all engines in response to the error signal. Such means could either operate on all throttles simultaneously with a single output signal or on each throttle individually where suitable drive mechanisms are provided.

In accordance with another aspect of the present invention, an EPR limiting mode operation may be provided such as during aircraft cruise when maximum thrust is not required. In this mode of operation, the engines are regulated by the existing autothrottle system and maintain the desired cruise speed as long as the engine EPR's are below the EPRL. Whenever the engine EPR exceeds the EPRL, all throttles are reduced automatically.

In accordance with another aspect of the present invention, there is connected into the autothrust management system an automatic mode control which will select the proper control or limiting mode depending on the desired flight condition. If the automatic mode is selected, the pilot must inform the automatic mode selector whether the aircraft is to operate in a climb, cruise, take-off or any other flight condition.

In accordance with another embodiment of the present invention, an engine autotrim or pressure ratio equalization control is provided which will automatically maintain or adjust each engine control or linkage such that each engine EPR is equal to the highest engine EPR which may or may not be at the limit. The actual EPR of each engine is compared with the maximum EPR of all engines, and a trim motor connected with the engine fuel control is actuated to adjust upward the EPR of that engine to equal that of the maximum EPR. A zero trim reference switch is provided in each fuel control trim motor, and all trim motors are automatically downtrimmed whenever none of the trims are at a minimum in order to maintain the authority of the fuel control trim motors and to prevent the trim motors from reaching a physical stop due to possible upward escalation of the trim motor positions following successive manual changes of throttle positions during aircraft operation.

BRIEF DESCRIPTION OF THE DRAWINGS

FIG. 1 is a schematic block diagram of the basic autothrust management system control.

FIG. 2 is a schematic block diagram of the autotrim system.

FIG. 3 is a schematic block diagram showing how the basic functions of the systems of FIGS. 1 and 2 may be performed by a multi-purpose computer in conjunction with an autothrottle system and a fuel control trim motor for each of the aircraft engines.

DESCRIPTION OF THE PREFERRED EMBODIMENT

Referring particularly to FIG. 1, there is shown in block diagram form the basic automatic thrust management system which operates in conjunction with the existing autothrottle system in multi-engine aircraft. An autothrottle system traditionally drives the throttles of all engines as a function of airspeed error, computed by comparing aircraft airspeed with a desired airspeed selected by the pilot, and fed as an input into the autothrottle system. The described automatic thrust management system takes advantage of the airspeed error ($IAS_e$) signal and the throttle drive motor already present in aircraft equipped with an autothrottle system. The additional functions required by the autothrust management system of this invention may be performed by conventional analog type electronic circuitry, or by means of a multi-purpose digital computer as shown in conjunction with FIG. 3.

As indicated previously, the engine pressure ratio limit (EPRL) is normally calculated by the flight crew, although some aircraft now make use of a computer which automatically establishes the EPRL continuously and displays it on an indicator. In either case, the flight crew must continually adjust the throttles, particularly during climb, to assure that the EPRL is not exceeded, and on the other hand to insure that the engines are producing maximum thrust by running as close as possible to the EPRL. If an EPRL computer is already installed in the aircraft, its output may be utilized as an input to the present autothrust management system. In no EPRL computer is available, the EPRL must be computed within the autothrust management system.

Shown in FIG. 1 is an EPRL computer 10 to which is supplied inputs indicative of aircraft altitude (ALT), Mach number ($M_n$), total air temperature (TAT) and engine bleed air. The computation of the EPRL from the inputs according to the specific engine performance curves is well known and may be performed by many existing devices and will not be described in detail.

The output from the EPRL computer, a signal indicative of the EPRL for the particular aircraft flight conditions, is fed through a signal line 12 to a comparator 14. Also fed to comparator 14 is a signal indicative of the maximum EPR of the engines in the aircraft. Assuming a standard four engine passenger aircraft, the actual engine pressure ratio (EPR) from each of the four engines sensed by means of transducers at the appropriate engine stations, is fed to a maximum selector 16 from which the EPR signal of maximum value is selected and fed through line 18 to the comparator 14. The maximum EPR signal is also fed through line 27 to FIG. 2 as will be described subsequently. Comparator 14 compares the EPRL signal with the maximum EPR signal and produces an EPR error signal ($EPR_e$) which is fed on signal line 20 through an EPR compensation network 22 and into a mode selector 24. The $EPR_e$ signal is also fed through a signal line 26 to an automatic mode logic block 28 whose output is connected through a signal line 30 and a switch 32 to the mode selector block 24.

As previously described, the existing autopilot system compares the desired pilot selected airspeed with the actual aircraft airspeed, and generates an indicated airspeed error ($IAS_e$). This signal is utilized in the present automatic thrust management system. The $IAS_e$ signal is fed through a signal line 34 into an IAS compensation network 36 and then into the mode selector block 24. The $IAS_e$ signal is also fed through a signal line 38 to the automatic mode logic block 28.

The mode selector block 24, which may be conventional electronic circuitry or a portion of a multi-purpose computer, consists of a switch which connects either the $EPR_e$ signal or the $IAS_e$ signal to the autothrottle system 44. The switch is shown schematically in block 24, but may be electronic logic circuitry or a computer. When the switch is set to pass the $EPR_e$ input the system operates in an EPR control mode and the power levers or throttles shown schematically at 46 will be moved simultaneously by the signal from autothrottle system 44 to increase or decrease the engine setting to increase or decrease power and thereby to null the $EPR_e$ signal. The pilot can enter this EPR control mode either by manual selection using switch 40, or automatically by using switch 32 and selecting a climb flight mode with switch 52. This mode will normally be selected during climb, or during other aircraft flight conditions involving heavy loads, that is, in general when maximum thrust is desired.

The alternative mode of operation is an EPR limiting mode which will normally be used during cruise or descent of the aircraft. It causes the aircraft to operate at the air-speed selected by the pilot, unless this requires such a high power that the EPR exceeds the EPRL. In this event the control will maintain $EPR_{max}$ equal to EPRL until such time as the airspeed reaches that selected by the pilot. This may occur either because the pilot selects a lower desired air-speed or more typically during cruise because the aircraft weight is decreasing as fuel is consumed and the aircraft is consequently accelerating while maintaining EPR equal to EPRL and a constant altitude. The pilot can enter this EPR limiting mode by closure of switch 32 and selection of the cruise flight mode. This will cause the automatic mode logic 28 to set the mode selector 24 so as to connect the $IAS_e$ signal to the autothrottle system 44. The power levers or throttles shown schematically at 46 will then be moved simultaneously by the $IAS_e$ signal to increase or decrease the engine setting to increase or decrease power and thereby to null the $IAS_e$ signal. In the event, however, that the $EPR_e$ signal 26 received by the automatic mode logic 28 decreases to zero, thereby indicating that $EPR_{max}$ has reached EPRL, the mode selector 24 will be operated so as to connect the $EPR_e$ signal to the autothrottle system 44. The automatic mode logic 28 will maintain the mode selector 24 in this position until it detects that $IAS_e$ signal 38 is equal to zero, indicating that the desired airspeed has been achieved. It will then restore that $IAS_e$ signal and the airspeed will be maintained at that selected by the pilot unless the EPRL is again exceeded due to further changes in aircraft operating condition.

Other flight mode inputs may be incorporated into the system without deviating from the teachings of the present invention. For example, multiple climb and/or cruise modes may be selected, each having significantly different limitations on the maximum EPR. Other functions which may be made available include take-off dry, take-off wet, go-around, descent, etc. For each of the various aircraft flight modes, the automatic mode logic 28 would be varied slightly so that the proper input signal to the autothrottle control 44 will be provided by mode selector 24 depending upon the flight condition desired and the relationship between the signals, with limits placed thereon in various modes. In addition, the control performance may be improved for specific aircraft applications by incorporating signal deadbands, time delays or other traditional dynamic compensation functions into the automatic mode logic 28.

In the present embodiment, with the only inputs to the automatic mode logic block 28 being climb and cruise, a simplified logic may be used. The logic may be simple electronic switching circuitry, or the logic may be performed by a special purpose or multiple purpose computer. This would facilitate many variations on the control logic. For example, when the pilot selects a cruise mode of flight by closing switch 54 and when the IAS signal is very much smaller than the IAS selected by the pilot, resulting in a large $IAS_e$ signal, this condition of operation is indicative of an accelerating flight condition and the mode selector block 24 could directly select the $EPR_e$ signal as the controlling signal. However, where the IAS signal is relatively close to the IAS selected by the pilot, resulting in a small $IAS_e$ signal, the mode selector 24 would select the $IAS_e$ to be controlling. In this latter case, where the $IAS_e$ signal controls throttle position, the $EPR_e$ signal must always be positive indicative of the fact that the EPR has not exceeded the EPRL. Thus, as described, during the climb flight mode, the engines will always be EPR limited. During cruise, the engines may either be EPR limited (during acceleration or heavy load) or will follow the standard autopilot $IAS_e$ input, but even in the latter case, the engine pressure ratio cannot exceed the engine pressure ratio limit.

FIG. 2 shows the engine autotrim or engine pressure ratio equalization system which may be used in conjunction with the autothrust management system of FIG. 1, but which also may be used independently. The purpose of the engine autotrim system is to maintain each of the engines at the same engine pressure ratio in order to balance the thrust produced by each engine. This would relieve the pilot of the necessity to modify each throttle lever individually by small amounts to balance the EPR's of each engine. To achieve this result, a trim screw is provided in the fuel control of each engine, the trim having limited authority to adjust the fuel flow so that differences in the pressure ratios of each engine may be eliminated.

FIG. 2 shows the components of the engine autotrim system. One of the autotrim systems is associated with each engine. A maximum EPR signal produced by comparing the EPR's from each engine and selecting the maximum signal therefrom is produced on signal line 27 as shown in FIG. 1. The maximum EPR signal is fed to a comparator 60 where it is compared with the actual EPR signal from the selected engine fed to the comparator on signal line 62. For that engine which produces the maximum EPR signal, the comparator 60 will produce a zero error signal; for all other engines, the actual EPR on signal line 62 will be less than the maximum EPR signal on line 27, and an $EPR_a$ signal will be generated by comparator 60 on line 64. The $EPR_a$ signal is fed to an uptrim inhibit block 66, the purpose of which will be explained later, and is then fed to uptrim control 68 which in turn feeds a signal to trim motor drive logic block 70. The trim motor drive logic produces the necessary drive pulses which are then fed through line 72 to an engine trim motor 74, generally a stepper motor. The engine trim motor 74 is connected to a trim screw in the engine fuel control downstream from the main throttle input to the control. The trim motor will have a limited authority, generally in the range of 20 percent of the fuel flow. In response to the actuation of the engine trim motor, the fuel flow will be increased so that the actual EPR in the selected engine will be equivalent to the EPR maximum whereby the $EPR_a$ signal is nulled.

Because the engine autotrim system of FIG. 2 will only allow uptrims of the engine trim motor 74, and because there is a limited trim range with physical stops, means are provided to prevent the engine trim motor 74 on the engine autotrim systems from becoming blocked at the upper limit. There is provided in connection with the engine trim motor 74 a limit switch 76 which will automatically close when the engine trim motor 74 is at its lower limit. A signal is fed from the switch 76 to an AND circuit 78. Only one AND circuit 78 is required for each aircraft. Aslo fed as inputs to AND circuit 78 are identical signals from the limit switches connected with the other engine trim motors. If none of the limit switches 76 are closed, thereby indicating that none of the engine trim motors are at the lower limit, AND circuit 78 will produce an output signal which is fed through a signal line 80 to a downtrim network 82 and to the uptrim inhibit 66 in each of the engine autotrim systems. Downtrim circuit 82 will feed a signal which instructs the trim motor drive logic 70 to drive the engine trim motor 74 in a direction which will reduce the fuel flow to each of the engines while at the same time the uptrim inhibit 66 will prevent a conflicting uptrim signal being supplied. Thus, all engines are downtrimmed simultaneously. When the engines are downtrimmed a sufficient amount that the limit switch 76 on at least one of the engine trim motors is closed, the output from the AND circuit 78 will reverse and no further downtrim is provided.

By downtrimming all of the engines, the engine pressure ratios in each of the engines will be reduced an equal amount, and there will thereby be no change in the $EPR_a$ signal on line 64. However, there will be a change in the $EPR_e$ signal of FIG. 1, and if the aircraft is operating in one of the modes in which the $EPR_e$ signal of FIG. 1 is controlling, a signal will be fed to the autothrottle control 44 and all throttles 46 will be moved in a direction to increase all engine fuel control settings and thereby all engine pressure ratios. The performance of the system for specific aircraft applications could be optimized by the various available control dynamic compensation functions being incorporated into the trim motor drive logic.

It is also apparent that where the automatic thrust management system of FIG. 1 is not provided, the reference signal $EPR_{max}$ from FIG. 1 could be denied within the engine autotrim system which would in that situation be connected to the other engine autotrim systems instead of to the automatic thrust management system. In this event an average EPR could alternatively be used as the reference in place of the $EPR_{max}$ with some benefit in performance for specific aircraft applications.

The embodiment of FIG. 3 shows how a multi-purpose computer may be used to implement the functions of FIGS. 1 and 2. The heart of the system is an automatic thrust management computer 90. Inputs to the computer 90 include those from the mode selector block 92, equivalent to the pilot actuated mode switches shown in conjunction with FIG. 1, and inputs from a central air data computer 94 which include altitudes, Mach number and total air temperature. These signals could provided by individual sensor inputs to computer 90 in aircraft systems where a central air data computer is not already available. Also fed as an input to computer 90 is the indicated airspeed error as determined by the autopilot and shown as IAS block 96.

Inputs to the computer 90 are also received from each engine 98. The engine pressure ratios, or the parameters necessary for determining the engine pressure ratios in computer 90, are fed from engine parameter sensors 100 connected with each engine 98.

The automatic thrust management computer 90 is programmed to perform the functions shown in FIGS. 1 and 2. An output signal is fed from the computer 90 to the autothrottle system 102 which controls throttles 104, these blocks being equivalent to corresponding blocks 44 and 46 of FIG. 1. Outputs are also fed from computer 90 to the fuel control trim motors 108 connected with each engine 98, the trim motor 108 being equivalent to trim motor 74 of FIG. 2. The functions of both FIGS. 1 and 2, or either, may be performed by the computer 90 depending upon the type of control desired in a particular aircraft.

The present invention thereby provides automatic control of the throttles of each engine during critical portions of an aircraft flight, and enhances engine life by preventing engine pressure ratio from exceeding a specified limit. The system also improves aircraft operating efficiency thereby insuring that engines are operating at the maximum limit when necessary. The present invention also minimizes the need for ground trimming of engine fuel controls and insures that all engines are operating at equivalent thrust levels.

Although the present invention has been described in terms of its preferred embodiments, it is apparent to those skilled in the art that changes and modifications thereof may be made without departing from the scope of the invention as hereinafter claimed.

I claim:

1. In an aircarft having a plurality of turbine engines, an engine autotrim system for maintaining each of said plurality of engines at the same pressure ratio comprising means for determining the pressure ratio across each of said plurality of engines and producing an engine pressure ratio signal indicative thereof, means for selecting from said plurality of engine pressure ratio signals the maximum of said signals, means for comparing each of said plurality of engine pressure ratio signals with said maximum signal to produce for each engine a pressure ratio error signal proportional to the difference therebetween, a fuel control for each of said plurality of engines for varying the flow of fuel thereto, fuel trimming means connected with each of said fuel controls and adapted to vary the fuel flow to each said respective engine, said fuel trimming means having a limited fuel adjustment range, and means for connecting each said pressure ratio error signal with the fuel trimming means for its respective engine to actuate said fuel trimming means and vary the flow of fuel to the engine in an amount and direction to null said pressure ratio error signal.

2. An engine autotrim system as in claim 1 in which said fuel trimming means is a trim screw located in a fuel flow passage to said engine downstream from said fuel control.

3. An engine autotrim system as in claim 1 further comprising a limit switch connected with each of said fuel trimming means, said limit switch being closed and producing a limit signal only when the respective fuel trimming means is at the limit of its fuel adjustment range whereby the minimum fuel flow passes therethrough, and means responsive to the absence of a limit signal from any of said limit switches to actuate the fuel trimming means for all of said engines in a direction to reduce the flow of fuel therethrough.

4. An engine autotrim system as in claim 3 further comprising means for disconnecting the pressure ratio error signal from all of said fuel trimming means when all of said limit switches are open.

* * * * *